(No Model.)  2 Sheets—Sheet 1.
E. E. WITTER.
CORN HARVESTER.
No. 518,516. Patented Apr. 17, 1894.
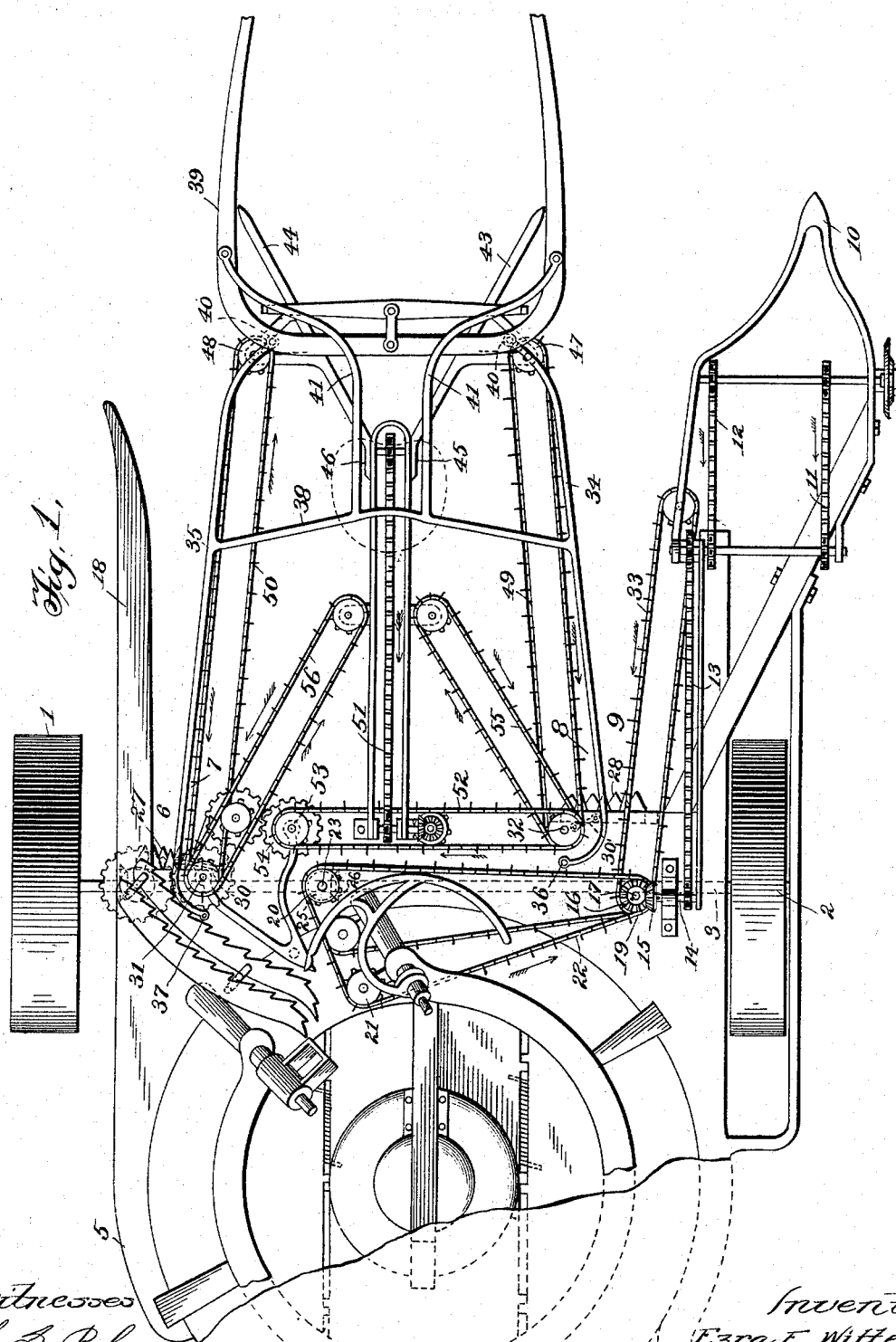
Witnesses
H. B. Rohrer
Jas. W. White
Inventor:
Ezra E. Witter.
By Knight Bros
Attys.

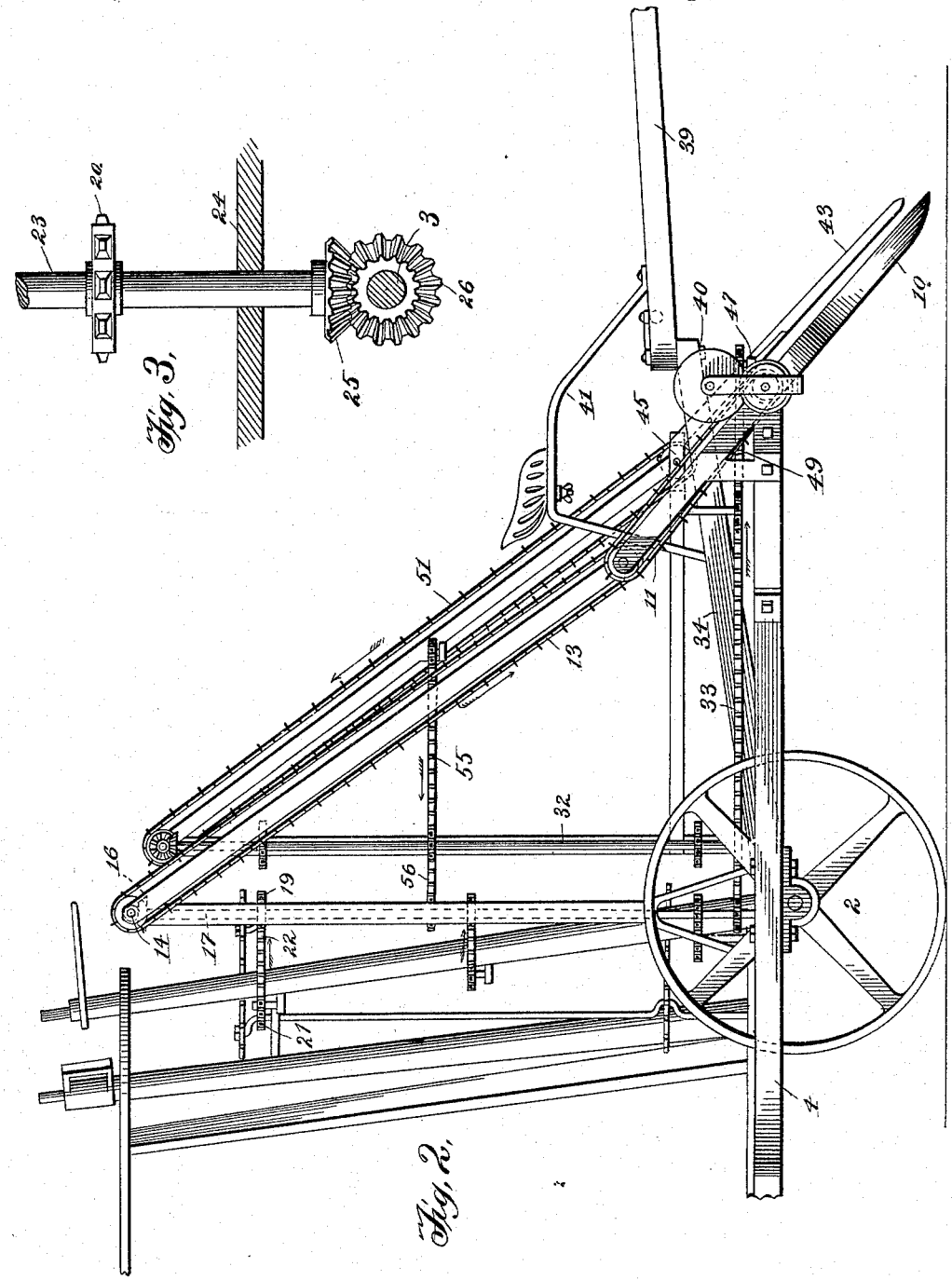

UNITED STATES PATENT OFFICE.

EZRA E. WITTER, OF MILFORD CENTRE, OHIO.

CORN-HARVESTER.

SPECIFICATION forming part of Letters Patent No. 518,516, dated April 17, 1894.

Application filed July 27, 1893. Serial No. 481,631. (No model.)

*To all whom it may concern:*

Be it known that I, EZRA E. WITTER, a citizen of the United States, residing at Milford Centre, in the county of Union and State of Ohio, have invented a new and useful Improvement in Corn-Harvesters, of which the following specification, taken in connection with the accompanying drawings, is a full, clear, and exact description.

My improvements relate to the type of machine covered by my patents No. 458,088, dated August 18, 1891, and No. 470,609, dated March 8, 1892, and like this type of machine my present improved machine employs suitable elevating and gathering devices for leading the corn to be cut to the entrances which are provided with suitable cutting mechanism, and a binding and shocking mechanism which is adapted to receive the cut corn and discharge it on the ground in form of shocks.

The object of my present invention is to produce a central draft corn-harvesting machine of simple construction, which will be light and easily manipulated, and at the same time will be capable of elevating and gathering the down corn between the rows, which has heretofore been impossible with central draft machines.

To this end my invention consists principally of a machine properly built and balanced upon two or more supporting wheels, and provided with centrally arranged elevating devices for gathering the down corn between the rows, and draft bars extending from the main part of the machine over the central elevating devices for guiding the corn to the entrances and affording means of attaching the thills to the machine at such a distance that they will not interfere with the operation of the elevating devices. In combination with these features, I employ suitable endless belts for gathering the corn into the shocking frame and suitable cutting mechanism for severing the corn before it is shocked.

In order that my invention may be fully understood I will first describe the same with reference to the drawings and afterward particularly point out the novel features in the annexed claims.

In said drawings:—Figure 1 is a top plan representation of my improved machine, part of the shocking frame being omitted. Fig. 2 is a side elevation of the same. Fig. 3 is a detail sectional view showing the manner of transferring the power from the main axle to the operating devices.

I have not thought it necessary to set forth the details of construction of my improved machine with much particularity, as these details can be arranged to suit the mechanic who constructs the machine. I have, however, shown sufficient of an operative machine to enable one skilled in the art to manufacture the same and to properly illustrate the features of novelty in my invention.

1 and 2 are the main supporting wheels which are mounted upon the axle 3, upon which the main frame 4 and shocking frame 5 are supported. The main frame and shocking frame are constructed of any suitable timbers substantially in the manner shown in my above-named patent.

6 and 7 represent the divided entrance for the corn at the left hand side of the machine, and 8 and 9 the divided entrance at the right hand side of the machine.

10 is the right hand side elevating and gathering device which is provided with the elevating chains 11, 12, and 13 which are supported upon suitable sprocket wheels and operated from the short shaft 14 which is keyed to its inner end to the beveled cog wheel 15 meshing with the corresponding cog gear 16 keyed to the upper end of the vertical shaft 17. The construction and arrangement of these belts are substantially the same as shown in my application, Serial No. 471,253, filed April 21, 1893.

18 is the gathering arm on the left hand side of the machine.

Mounted upon the sprocket wheels 19, 20 and 21, is the endless chain 22 which is provided with a series of lugs on its outer face to engage the corn and feed it forward to the shocking mechanism. The sprocket wheel 19 is keyed to the vertical shaft 17 which carries the beveled cog 16. The sprocket wheel 20 is keyed to the vertical shaft 23 which extends below the platform 24 of the machine and is provided at its lower end with a beveled wheel 25 which meshes with a smaller bevel wheel 26 which is keyed to the main supporting axle 3. By this means the endless feeding belt 22 and the elevating belts 11, 12, and 13 are operated and as will be clearly understood by reference to Fig. 1 of the drawings.

27 and 28 are suitable reciprocating cutters which traverse the entrances 6, 7, 8 and 9 at the opposite sides of the machine for cutting the corn. These reciprocating cutters are operated by means of pitmen 30 which connect them to suitable cranks mounted on the vertical shafts 31 32.

33 represents one or more horizontally running endless belts for feeding the corn from the elevating finger 10 to the entrance 9.

34 and 35 are the draft bars which are attached to the main frame of the machine at 36 and 37 and extend forward to a point nearly over the central elevating and gathering devices. The draft bars are braced by the upwardly arched cross-piece 38.

39 represent the thills which are attached at 40 to the forward ends of the draft bars and securely braced thereto by the curved extensions 41 of the brace 38.

42 is the seat adjustably supported on the braces 41, 41.

43 and 44 are the centrally supported outwardly diverging elevating fingers, which are adapted to raise the fallen corn between the rows onto a central elevating belt or chain 51 which straightens it up to each side into the row from which it has fallen before it reaches the cutters. These fingers are securely supported at 45, 46, by suitable braces.

49 and 50 are horizontally traveling endless belts which are mounted upon suitable pulleys journaled at 47, 48, and 31, 32, and adapted to feed the corn forward inside of the draft bars 34, 35, to the entrances 7 and 8.

51 is an inclined elevating belt mounted upon suitable pulleys and operated at its upper end by suitable gearing with the transverse feeding belt 52 which is carried by the sprocket wheels 53 and 54 and serves to transfer the corn from the entrance 8.

55 and 56 are diagonally arranged belts for assisting in elevating the corn from the central elevating devices. These belts may be geared as shown.

The corn is fed along by the belts and through feeding devices after it is cut, to the shocking frame, in substantially the manner clearly shown in my former patents. As nothing new is claimed in these feeding devices and shocking mechanism, it will not be necessary to describe them more fully.

It will be observed that by my central draft corn-harvesting machine, the down corn may be gathered from the space between the rows which are being cut, and in which space the draft animal walks. This is a result which has not before been accomplished. By extending the draft-bars 34, 35, so far forward of the machine, and diverging the elevating points 43 and 44 to each side, I am able to hitch the horses much closer to the machine without interfering with its operation, and also more effectually gather the down stalks between the rows.

Having thus fully described my invention, what I claim as new therein, and desire to secure by Letters Patent, is—

1. In a central draft corn harvesting machine, the combination of the main frame having the side entrances for the corn to be cut, the cutting mechanism, the side elevating and gathering devices leading to the said side entrances, the centrally arranged draft-bars secured to the main frame at points on each side adjacent to the entrances and extending forwardly so as to guide the stalks of corn from the sides and center to the said entrances, the thills attached to the draft-bars, elevating and gathering points located between and below the draft-bars and thills for elevating the down corn between the rows, and suitable gathering chains supported in proximity to the draft-bars and central elevating points for carrying the corn from the elevating points along the guiding draft-bars to the entrances, substantially as and for the purposes set forth.

2. In a central draft corn harvesting machine the combination of the main frame having the side entrances for the corn to be cut, the cutting mechanism, the side elevating and gathering devices leading to the said side entrances, the centrally arranged draft-bars secured to the main frame at points on each side adjacent to the entrances and extending forwardly so as to guide the corn from both the sides and the center to the said entrances, the thills attached to the draft-bars, the centrally supported outwardly diverging elevating points located between and below the draft-bars and thills for elevating the down corn between the rows, and the gathering chains extending from the rear of the central elevating points below the draft-bars to points near the rear ends of and above the draft-bars, for carrying the corn from the central elevating points along the guiding draft-bars to the entrances, substantially as and for the purpose set forth.

EZRA E. WITTER.

Witnesses:
H. S. ADAMS,
A. H. GOODWIN.